(12) United States Patent  
Kim

(10) Patent No.: US 8,608,380 B2  
(45) Date of Patent: Dec. 17, 2013

(54) AIR DISCHARGE VALVE FOR A VACUUM-SEALED CLOTHES BAG

(75) Inventor: Myung Soo Kim, Seoul (KR)

(73) Assignee: In Soo Kim, Seoul (KR)

( * ) Notice: Subject to any disclaimer, the term of this patent is extended or adjusted under 35 U.S.C. 154(b) by 299 days.

(21) Appl. No.: 13/080,275

(22) Filed: Apr. 5, 2011

(65) Prior Publication Data

US 2011/0249917 A1  Oct. 13, 2011

(30) Foreign Application Priority Data

Apr. 7, 2010 (KR) .................. 10-2010-0031687

(51) Int. Cl.
| | |
|---|---|
| *B65D 33/01* | (2006.01) |
| *B65D 33/14* | (2006.01) |
| *B65D 85/18* | (2006.01) |
| *B65D 81/20* | (2006.01) |

(52) U.S. Cl.  
USPC ............. 383/100; 383/103; 383/23; 206/286; 206/287; 206/288; 206/289; 206/524.8

(58) Field of Classification Search  
USPC ......... 383/100, 103, 23; 206/286, 287, 524.8, 206/288, 289, 300, 279; 251/143  
See application file for complete search history.

(56) References Cited

U.S. PATENT DOCUMENTS

| 1,119,986 | A * | 12/1914 | Pleger et al. ................... 206/213 |
|---|---|---|---|
| 5,735,395 | A * | 4/1998 | Lo .................................. 206/278 |
| 5,746,360 | A * | 5/1998 | Chen ............................... 223/85 |
| 5,954,196 | A * | 9/1999 | Lin ................................ 206/286 |
| 6,029,810 | A * | 2/2000 | Chen .............................. 206/287 |
| 6,622,857 | B2 * | 9/2003 | Ohtsubo et al. ................ 206/287 |
| 6,712,334 | B2 * | 3/2004 | Motonaka et al. .......... 251/149.6 |
| 6,837,268 | B2 * | 1/2005 | Skeens et al. ................... 137/550 |
| 7,513,481 | B2 * | 4/2009 | Su .................................... 251/82 |
| 7,713,320 | B2 * | 5/2010 | Pham .......................... 55/385.4 |
| 8,066,433 | B2 * | 11/2011 | Sabounjian ................... 383/103 |
| 2003/0015452 | A1 * | 1/2003 | Su ............................... 206/524.8 |
| 2005/0072125 | A1 * | 4/2005 | Salvaro .......................... 53/512 |
| 2007/0068841 | A1 * | 3/2007 | Tanaka ....................... 206/524.8 |
| 2008/0095475 | A1 * | 4/2008 | Su .................................... 383/23 |
| 2009/0052808 | A1 * | 2/2009 | Pham et al. ..................... 383/23 |

* cited by examiner

*Primary Examiner* — Anthony Stashick  
*Assistant Examiner* — Latrice Byrd  
(74) *Attorney, Agent, or Firm* — IP & T Group LLP

(57) ABSTRACT

An air discharge valve for a vacuum-sealed clothes bag having a flexible container includes a valve body for openably closing the vacuum-sealed clothes bag. A hanger is attached to the valve body to extend upwards from the valve body, the hanger being arranged in a substantially coplanar relationship with the valve body. An anchor member is securely attached to the flexible container. First and second fixing caps are fixed to opposite surfaces of the anchor member. A cloth holder is suspended from the anchor member to hold a cloth contained in the flexible container. The valve body is fitted to the first and second fixing caps in a rotatable manner.

5 Claims, 8 Drawing Sheets

US 8,608,380 B2

AIR DISCHARGE VALVE FOR A VACUUM-SEALED CLOTHES BAG

CROSS-REFERENCE TO RELATED APPLICATIONS

The present application claims priority of Korean Patent Application No. 10-2010-0031687, filed on Apr. 7, 2010, which is incorporated herein by reference in its entirety

FIELD OF THE INVENTION

The present invention relates to an air discharge valve for a vacuum-sealed clothes bag and, more specifically, to an air discharge valve for a vacuum-sealed clothes bag serving as a hanger and an air discharger and having a reduced thickness.

BACKGROUND OF THE INVENTION

Vacuum-sealed clothes bags are extensively used to store a variety of clothes in a vacuum pressure. The clothes bag is decompressed by discharging the air existing in the clothes bag.

The vacuum-sealed clothes bags are capable of reducing the volume of clothes and storing the clothes in a sealed state. This makes it convenient to store and transport the clothes while preventing infiltration of moisture, bacteria and other materials into the clothes bags. In some cases, the clothes bags are used to store bedclothes in a compressed state.

A typical vacuum-sealed clothes bag includes a flexible container for holding clothes therein and an air discharge valve attached to the flexible container for discharging an air from the flexible container. The flexible container is usually made from a transparent synthetic resin sheet.

Clothes are put into the flexible container and the mouth of the flexible container is air-tightly closed. Thereafter, the air existing within the flexible container is discharged through the air discharge valve by means of a vacuum cleaner or the like, thereby reducing the volume of the clothes held within the flexible container.

The conventional vacuum-sealed clothes bag further includes a hanger extending in the thickness direction of the flexible container. This increases the overall size of the clothes bag, consequently requiring a large storage space. Moreover, the hanger of the clothes bag is formed into a rectangular frame shape and may tear the resin-made flexible container when handling the clothes bag.

A keen need has existed for an improved vacuum-sealed clothes bag which is small in size and in component number, effective in simplifying the manufacturing process and reducing the manufacturing cost, and capable of preventing the flexible container from being torn by the hanger.

SUMMARY OF THE INVENTION

In view of the problems inherent in the prior art, it is an object of the present invention to provide an air discharge valve for a vacuum-sealed clothes bag capable of serving as a hanger and an air discharger.

Another object of the present invention is to provide an air discharge valve for a vacuum-sealed clothes bag having a reduced thickness and requiring a reduced storage space.

In accordance with the present invention, there is provided an air discharge valve for a vacuum-sealed clothes bag having a flexible container, including:

a valve body for openably closing the vacuum-sealed clothes bag;

a hanger attached to the valve body to extend upwards from the valve body, the hanger being arranged in a substantially coplanar relationship with the valve body;

an anchor member securely attached to the flexible container;

first and second fixing caps fixed to opposite surfaces of the anchor member; and a cloth holder suspended from the anchor member to hold a cloth contained in the flexible container, the valve body being fitted to the first and second fixing caps in a rotatable manner.

BRIEF DESCRIPTION OF THE DRAWINGS

The above and other objects and features of the present invention will become apparent from the following description of preferred embodiments, given in conjunction with the accompanying drawings.

DETAILED DESCRIPTION OF THE PREFERRED EMBODIMENTS

One preferred embodiment of the present invention will now be described in detail with reference to the accompanying drawings.

Figure 1:
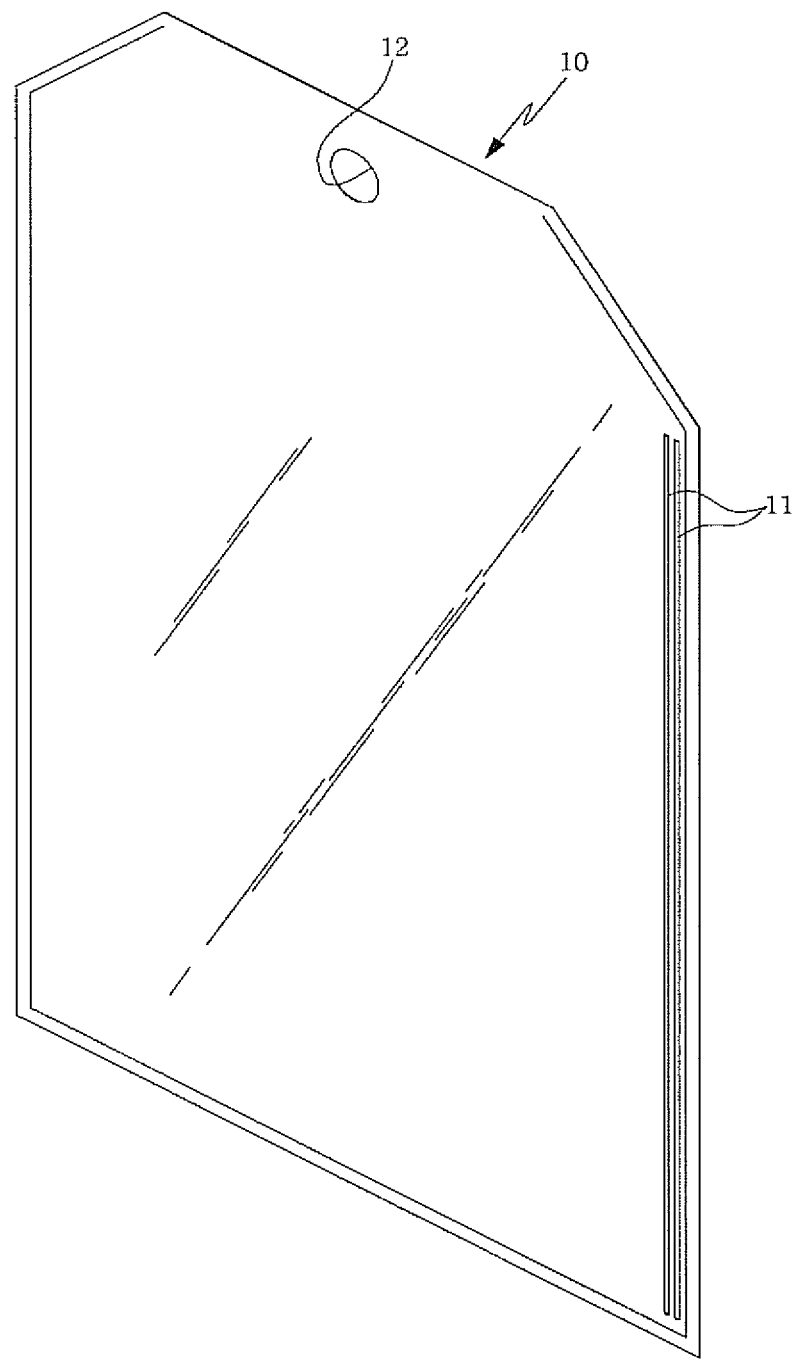
FIG. 1 is a perspective view showing a flexible container of a vacuum-sealed clothes bag.
Figure 2:
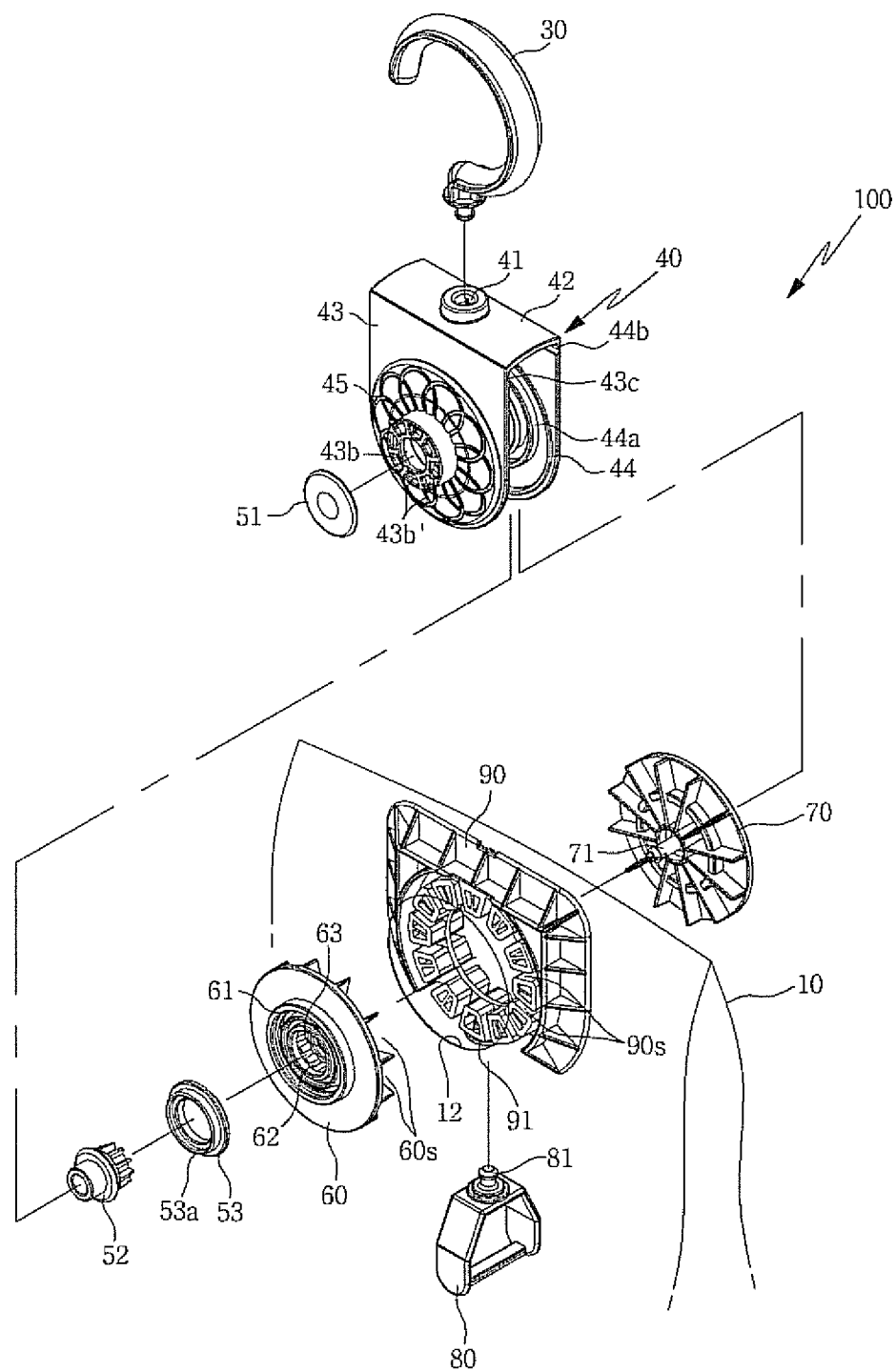
FIG. 2 is an exploded perspective view showing an air discharge valve for a vacuum-sealed clothes bag in accordance with one embodiment of the present invention.
Figure 3:
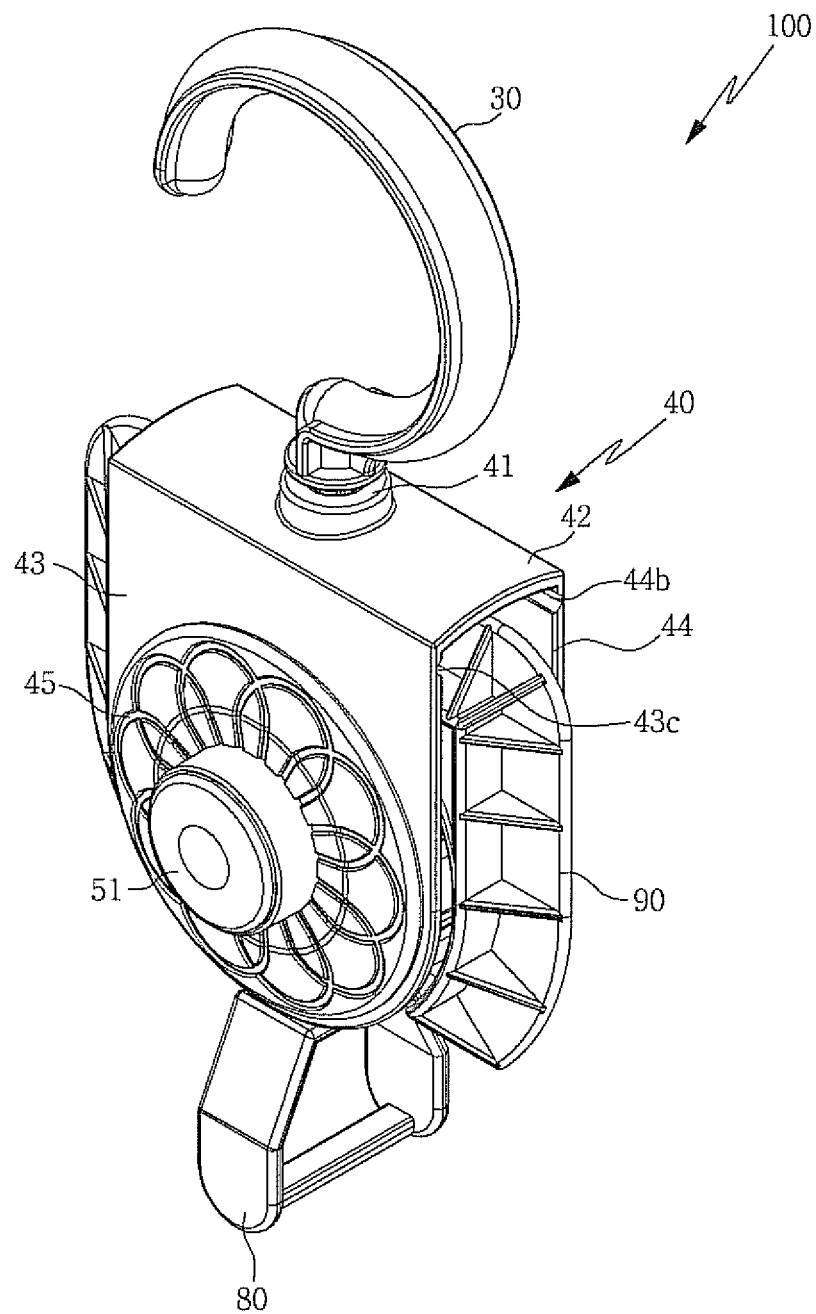
FIG. 3 is an assembled perspective view of the present air discharge valve for a vacuum-sealed clothes bag.
Figure 4:
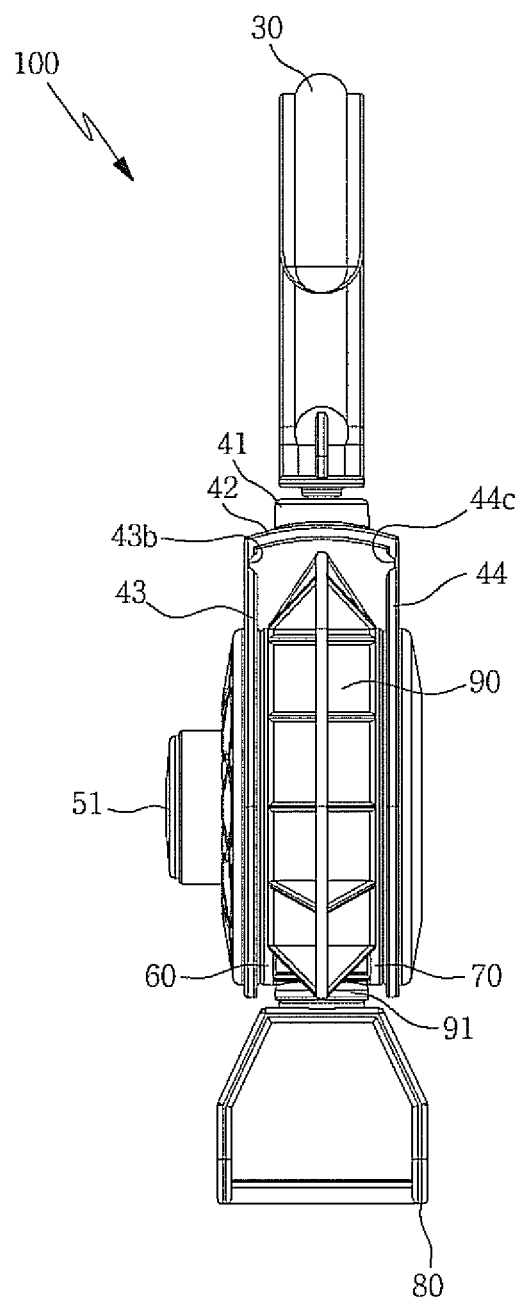
FIG. 4 is a side view of the present air discharge valve for a vacuum-sealed clothes bag.
Figure 5:
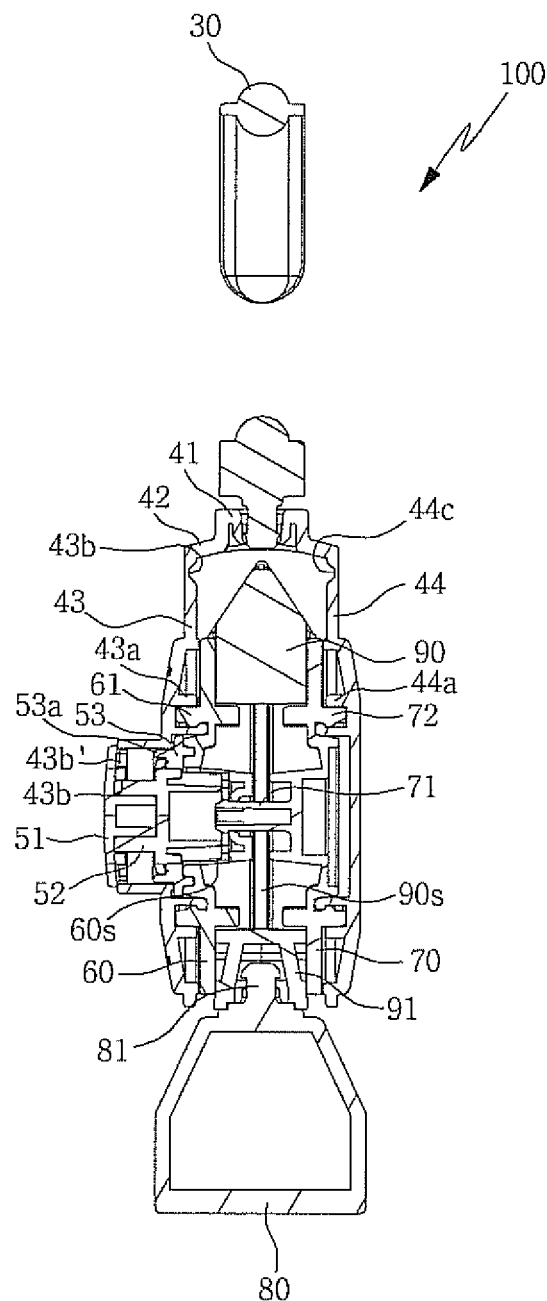
FIG. 5 is a vertical section view of the present air discharge valve for a vacuum-sealed clothes bag.

Referring to FIG. 1, there is shown a flexible container 10 of a vacuum-sealed clothes bag. The flexible container 10 is made of a transparent flexible material and is provided at one side with a mouth that can be openably closed by a fastener 11. The flexible container 10 has an air communication hole 12 defined in the top area thereof. An air discharge valve 100 is securely fixed to the air communication hole 12 of the flexible container 10.

As shown in FIGS. 2 through 5, the air discharge valve 100 includes a valve body 40 for openably closing the vacuum-sealed clothes bag 10, a hanger 30 rotatably attached to the valve body 40 in a substantially coplanar relationship with the valve body 40, an anchor member 90 securely attached to the flexible container 10, a first fixing cap 60 fixed to one side of the anchor member 90, a second fixing cap 70 fixed to the other side of the anchor member 90 and a cloth holder 80 suspended from the anchor member 90 to hold a cloth contained in the flexible container 10.

The valve body 40 includes a central portion 42 and first and second wings 43 and 44 extending downwards from the central portion 42 substantially in a parallel relationship with each other. The central portion 42 has a pivot hole 41 into which the hanger 30 is fitted in a rotatable manner. The valve body 40 is formed into a generally U-shape so that the first and second wings 43 and 44 can face toward each other. The first wing 43 includes an outer surface, a guide sleeve 43*b* protruding outwards from the outer surface, a plurality of air flow grooves 45 defined on the outer surface around the guide sleeve 43*b* and a plurality of air discharge holes 43*b'* formed in the guide sleeve 43*b*. The first and second wings 43 and 44 have first and second bending grooves 43*c* and 44*b* (see FIG. 5) formed on the inner surface thereof near the central portion 42. In addition, the first and second wings 43 and 44 have first and second coupling grooves 43*a* and 44*a* (see FIG. 5) of annular shape formed on the inner surfaces thereof. An end cap 51 is removably fitted to the guide sleeve 43*b* of the first wing 43.

The anchor member 90 is attached to the flexible container 10 in alignment with the air communication hole 12. The anchor member 90 has a pair of hub portions formed on the opposite surfaces thereof to protrude away from each other. Each of the hub portions has a plurality of radial slots 90*s* arranged at generally regular intervals along a circumferential direction of each of the hub portions and a nipple hole 91 formed in the lower end portion thereof.

The first fixing cap 60 is fitted to one surface of the anchor member 90. The first fixing cap 60 has a plurality of radial ribs 60*s* formed on the inner surface thereof, a first fitting rim 61 formed on the outer surface thereof, a plurality of air holes 62 through which an air can flow and a central fitting hole 63 extending through the thickness thereof. When the first fixing cap 60 is fitted to the anchor member 90, the radial ribs 60*s* of the first fixing cap 60 come into engagement with the radial slots 90*s* formed on one surface of the anchor member 90.

The second fixing cap 70 is fitted to the other surface of the anchor member 90. The second fixing cap 70 has a plurality of radial ribs formed on the inner surface thereof, a second fitting rim 71 formed on the outer surface thereof and a central coupling shaft 71 protruding inwards. When the second fixing cap 70 is fitted to the anchor member 90, the radial ribs of the second fixing cap 70 come into engagement with the radial slots 90*s* formed on the other surface of the anchor member 90.

A locking member 52 is inserted into the central fitting hole 63 of the first fixing cap 60. A seal ring 53 with an insertion rim 53*a* is interposed between the locking member 52 and the first fixing cap 60. The locking member 52 is coupled with the central coupling shaft 71 to keep the first fixing cap 60 and the second fixing cap 70 engaged with each other.

The cloth holder 80 has a nipple 81 formed at the upper end thereof. The nipple 81 is inserted into the nipple hole 91 of the anchor member 90 so that the cloth holder 80 can rotate with respect to the anchor member 90. The cloth holder 80 is used to hold a cloth contained within the flexible container 10. The cloth holder 80 has slant shoulders, which assists in preventing the cloth holder 80 from tearing the flexible container 10.

If the first fixing cap 60 and the second fixing cap 70 are fixed to the anchor member 90 by means of the locking member 52, the valve body 40 is press-fitted to the first fixing cap 60 and the second fixing cap 70 in a rotatable manner. The first and second fitting rims 61 and 71 of the first fixing cap 60 and the second fixing cap 70 come into engagement with the coupling grooves 43*a* and 44*a* of the first and second wings 43 and 44, thereby preventing removal of the valve body 40 from the first fixing cap 60 and the second fixing cap 70.

Figure 6:
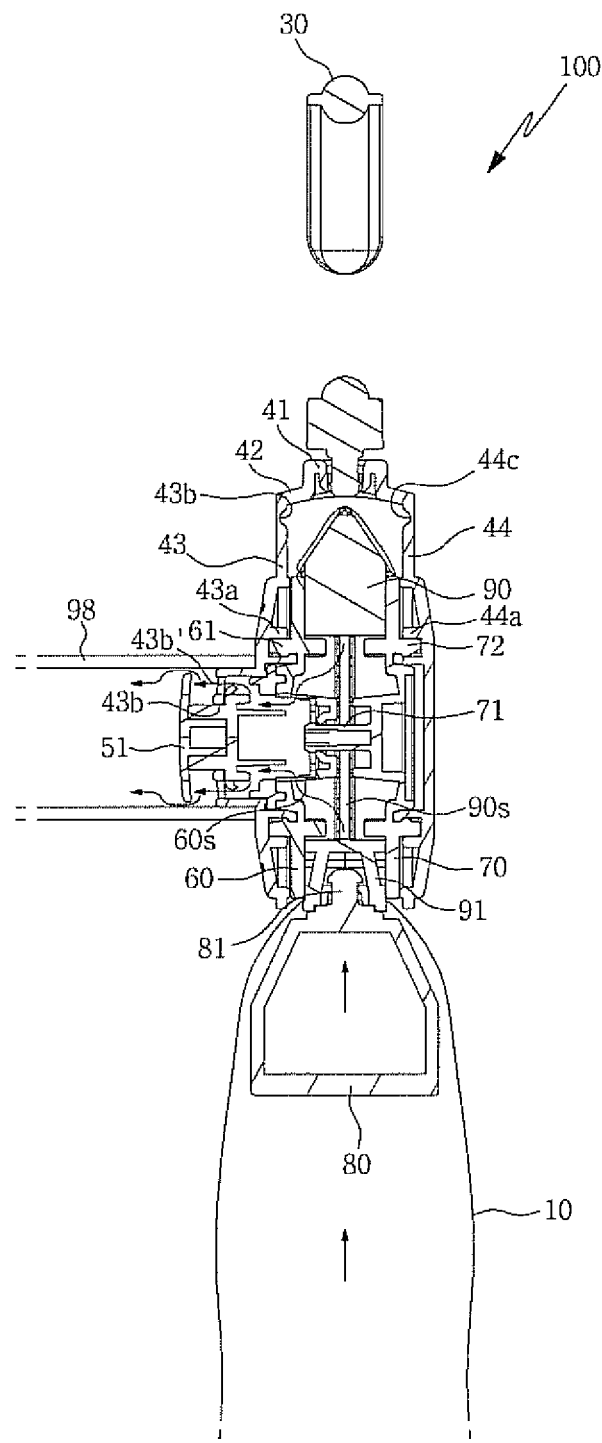
FIG. 6 shows how to discharge an air from a flexible container using the present air discharge valve.
Figure 7:
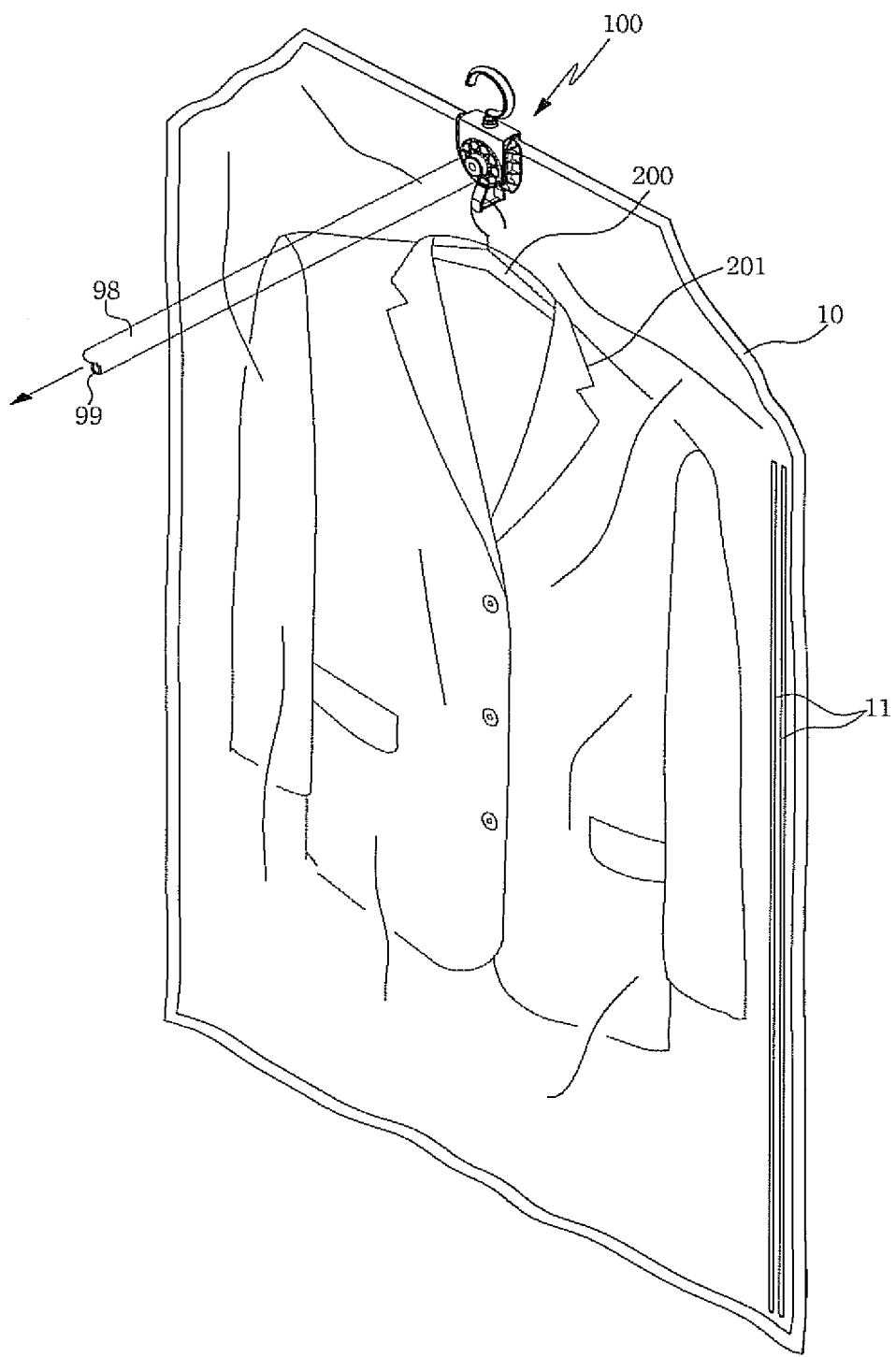
FIG. 7 is a perspective view showing a vacuum-sealed clothes bag with the present air discharge valve, in which a cloth is vacuum-packed within a flexible container using the present air discharge valve.
Figure 8:
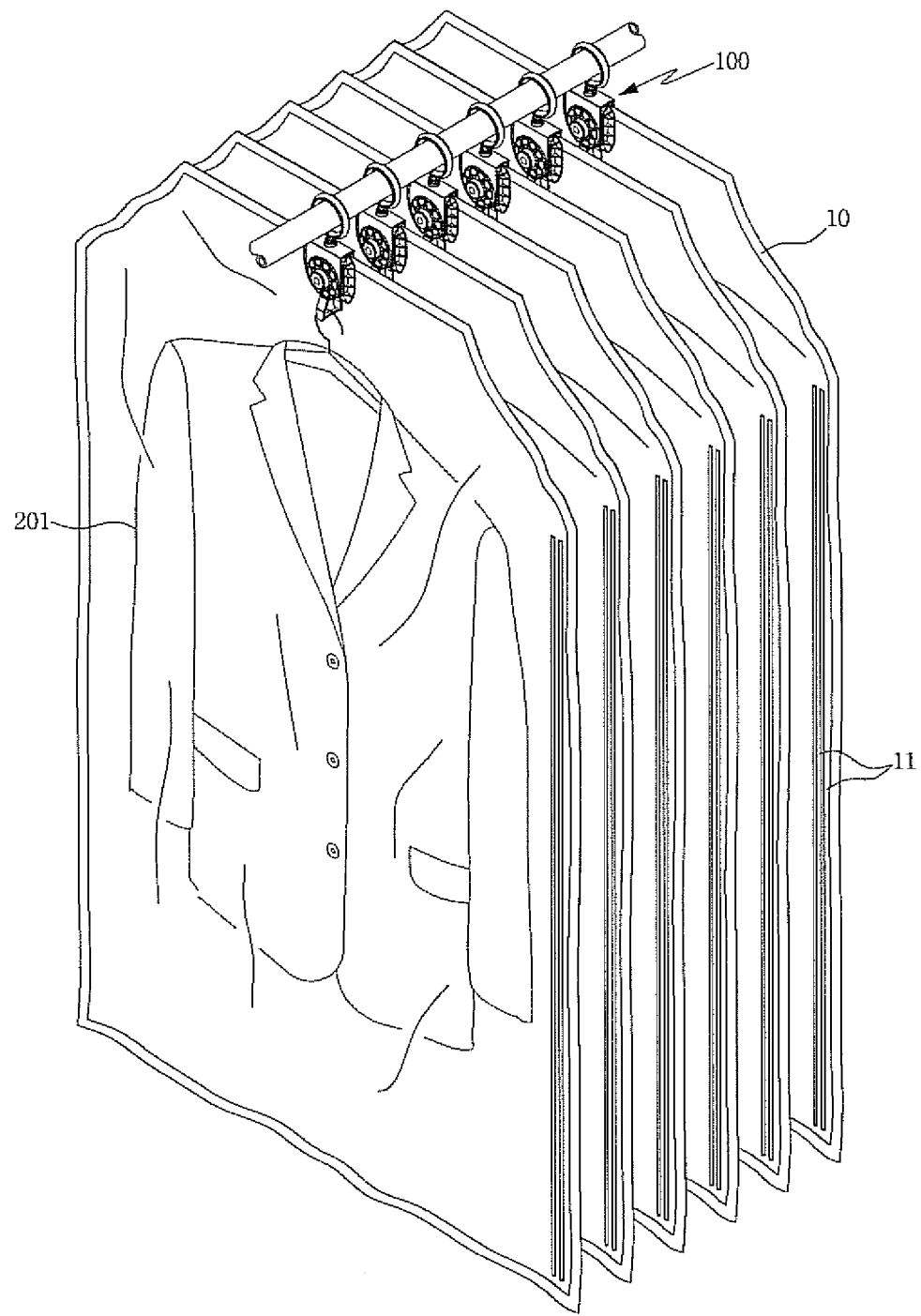
FIG. 8 is a perspective view showing a plurality of vacuum-sealed clothes bags arranged along a suspension rod.

Once the valve body 40 is fitted to the first fixing cap 60 and the second fixing cap 70, a cloth is put into the flexible container 10 and then the mouth of the flexible container 10 is air-tightly closed by the fastener 1. Thereafter, the air existing within the flexible container 10 is discharged to reduce the volume of the flexible container 10. As shown in FIGS. 6 and 7, a suction tube of a vacuum cleaner 98 is press-fitted to the guide sleeve 43*b* of the first wing 43 of the valve body 40. If the vacuum cleaner 98 is operated in this state, the end cap 51 and the locking member 52 are pulled outwards to thereby create an air flow path 99 between the locking member 52 and the seal ring 53. Thus, the air existing within the flexible container 10 is discharged through the valve body 40 as indicated by arrows in FIG. 6. This makes it possible to vacuum-pack a cloth within the flexible container 10. If the vacuum cleaner 98 is removed from the valve body 40, the locking member 52 comes into contact with the seal ring 53, consequently preventing an ambient air from entering the flexible container 10.

While one preferred embodiment of the invention has been described hereinabove, the present invention is not limited thereto. It is to be understood that various changes and modifications may be made without departing from the scope of the invention defined in the claims.

What is claimed is:

1. An air discharge valve for a vacuum-sealed clothes bag having a flexible container, comprising:
    a valve body for openably closing the vacuum-sealed clothes bag;
    a hanger attached to the valve body to extend upwards from the valve body, the hanger being arranged in a substantially coplanar relationship with the valve body;
    an anchor member securely attached to the flexible container;
    first and second fixing caps fixed to opposite surfaces of the anchor member; and
    a cloth holder suspended from the anchor member to hold a cloth contained in the flexible container, the valve body being fitted to the first and second fixing caps in a rotatable manner,
    wherein the valve body includes a central portion and first and second wings extending downwards from the central portion substantially in a parallel relationship with each other.

2. The air discharge valve as recited in claim 1, wherein the first fixing cap has a central fitting hole, the second fixing cap having a coupling shaft extending into the central fitting hole of the first fixing cap.

3. The air discharge valve as recited in claim 2, further comprising:
    a locking member inserted into the central fitting hole of the first fixing cap for engagement with the coupling shaft of the second fixing cap; and
    a seal ring arranged between the locking member and the first fixing cap.

4. The air discharge valve as recited in claim 1, wherein the cloth holder has slant shoulders.

5. An air discharge valve for a vacuum-sealed clothes bag having a flexible container, comprising:
    a valve body for openably closing the vacuum-sealed clothes bag;
    a hanger attached to the valve body to extend upwards from the valve body, the hanger being arranged in a substantially coplanar relationship with the valve body;
    an anchor member securely attached to the flexible container;
    first and second fixing caps fixed to opposite surfaces of the anchor member;
    a cloth holder suspended from the anchor member to hold a cloth contained in the flexible container, the valve body being fitted to the first and second fixing caps in a rotatable manner, wherein the first fixing cap has a central fitting hole, the second fixing cap having a coupling shaft extending into the central fitting hole of the first fixing cap, a locking member inserted into the central fitting hole of the first fixing cap for engagement with the coupling shaft of the second fixing cap; and a seal ring arranged between the locking member and the first fixing cap.

* * * * *